UNITED STATES PATENT OFFICE.

JAMES HARRISON, OF CASTALIA, NORTH CAROLINA.

IMPROVEMENT IN COMPOUNDS FOR THE CURE OF CANCERS.

Specification forming part of Letters Patent No. 114,810, dated May 16, 1871.

*To all whom it may concern:*

Be it known that I, JAMES HARRISON, of Castalia, in the county of Nash and State of North Carolina, have invented a new and useful Medical Compound for the Cure of Cancers and Cancer Warts and Sores; and I do hereby declare the following to be a full, clear, and exact description thereof, sufficient to enable those skilled in the art to which my invention appertains to fully understand and to make and use the same.

My invention consists in a preparation composed of the ingredients hereinafter named, or their equivalents, employed in the proportions and compounded in the manner substantially as set forth, for the cure of cancers, cancer-warts, and cancer-sores.

To prepare my compound, I add to one-half pint of old brandy two table-spoonfuls of coarse alum-salt, beaten fine, one ounce of gum-camphor, and one table-spoonful of honey. These ingredients are well intermixed by stirring and shaking, and the mixture is then allowed to stand forty-eight hours, after which it is strained off and is ready for use.

In applying the mixture I direct that it be used to bathe the cancer, wart, or sore three times a day. After the first day the dead skin must be removed before bathing. This treatment is continued until a cure is effected.

Having thus described my invention, what I claim as new, and desire to secure by Letters Patent, is—

A preparation composed of the ingredients hereinbefore mentioned, employed in the proportions and compounded in the manner substantially as set forth, for the purpose specified.

To the above specification of my invention I have signed my name this 4th day of April, 1871, in the presence of the two subscribing witnesses.

JAMES HARRISON.

Witnesses:
JOHN A. HARRISON,
DANIEL T. PRICE.